United States Patent [19]

Pfeil et al.

[11] Patent Number: 5,845,277

[45] Date of Patent: Dec. 1, 1998

[54] PRODUCTION OF STATISTICALLY-BASED NETWORK MAPS

[75] Inventors: John M. Pfeil; Kenneth A. Mennenga, both of Colorado Springs, Colo.

[73] Assignee: MCI Communications Corporation, Washington, D.C.

[21] Appl. No.: 770,096

[22] Filed: Dec. 19, 1996

[51] Int. Cl.⁶ .................................................. G06F 17/30
[52] U.S. Cl. ................................ 707/3; 707/10; 707/104; 711/205; 395/680; 370/270
[58] Field of Search ........................ 395/200.53, 200.54, 395/183.19, 680, 709; 707/104, 10, 3; 711/205; 436/140; 364/512; 359/111, 182.02; 370/408; 1/1

[56] References Cited

U.S. PATENT DOCUMENTS

| | | | |
|---|---|---|---|
| 5,175,800 | 12/1992 | Galis | 395/51 |
| 5,185,860 | 2/1993 | Wu | 395/200.54 |
| 5,592,620 | 1/1997 | Chen | 395/200.53 |
| 5,592,661 | 1/1997 | Eisenberg | 707/104 |
| 5,634,009 | 5/1997 | Iddon | 395/838 |
| 5,651,006 | 7/1997 | Fujino | 370/408 |
| 5,706,501 | 1/1998 | Horikiri | 1/1 |

*Primary Examiner*—Thomas G. Black
*Assistant Examiner*—Diane D. Mizrahi

[57] ABSTRACT

A system and method for representing a network according to a hierarchy of views of varying detail. The system models networks as a plurality of interconnected nodes. The display is made more simple by combining network elements (i.e., nodes and connections) in two ways. Nearby nodes within a user-selectable proximity are displayed as a single "supernode." Similarly, connections between all the nodes represented by two supernodes are displayed as a single connection between the supernodes. The system adjusts the relative size of each supernode in proportion to the number of nodes each supernode represents. Similarly, the thickness of each inter-supernode connection is adjusted in proportion to the number of inter-node connections it represents. The system allows a user to conveniently "zoom-in" or "zoom-out," and to adjust the level of detail depicted in the display.

27 Claims, 9 Drawing Sheets

FIG. 3A

| NODE IDENTIFIER | X COORD | Y COORD |
|---|---|---|
| NE1 | 3 | 4 |
| NE2 | 3 | 8 |
| NE3 | 9 | 6 |
| NE4 | 12 | 5 |
| NE5 | 14 | 7 |
| NE6 | 19 | 9 |
| NE7 | 4 | 16 |
| NE8 | 7 | 14 |
| NE9 | 14 | 15 |

| GRID SQUARE: | | | | |
|---|---|---|---|---|
| ROW | COLUMN | NODE IDENTIFIER | X COORD | Y COORD |
| 1 | 1 | NE1 | 3 | 4 |
| 1 | 1 | NE2 | 3 | 8 |
| 1 | 1 | NE3 | 9 | 6 |
| 1 | 2 | NE4 | 12 | 5 |
| 1 | 2 | NE5 | 14 | 7 |
| 1 | 2 | NE6 | 19 | 9 |
| 2 | 1 | NE7 | 4 | 16 |
| 2 | 1 | NE8 | 7 | 14 |
| 2 | 2 | NE9 | 14 | 15 |

| GRID SQUARE: | | | | |
|---|---|---|---|---|
| ROW | COLUMN | X COORD | Y COORD | SIZE |
| 1 | 1 | 5 | 6 | 3 |
| 1 | 2 | 15 | 7 | 3 |
| 2 | 1 | 5.5 | 15 | 2 |
| 2 | 2 | 14 | 15 | 1 |

| CIRCUIT IDENTIFIER | NODE 1 | NODE 2 | WEIGHT | CTO |
|---|---|---|---|---|
| CKT12 | NE1 | NE2 | 100 | off |
| CKT34 | NE1 | NE9 | 90 | off |
| CKT56 | NE3 | NE4 | 50 | on |
| CKT78 | NE6 | NE8 | 100 | off |

T4

PRODUCTION OF STATISTICALLY-BASED NETWORK MAPS

BACKGROUND OF THE INVENTION

1. Field of the Invention

The present invention relates generally to network management, and more particularly to displaying a network of interconnected nodes in a manner that is easy to comprehend using a hierarchy of views of varying detail.

2. Related Art

Many electronic devices or processes may be characterized as a network of interconnected nodes. Electronic circuits, such as neural networks, may be viewed as a number of individual processing elements interconnected by communication pathways. Workstations in close geographical proximity interconnected by cables form either a local area network (LAN) or a wide area network (WAN). Millions of telephones interconnected by cables and satellite links form a telecommunications network.

Network managers are often responsible for monitoring these networks. Under normal operating conditions, the distribution of burdens across the network must be monitored to ensure that some nodes aren't stressed more than others. If the distribution becomes uneven, the network manager might adjust the network to equalize these burdens, thereby improving performance. Also, network managers must react quickly when the network experiences some unexpected difficulty. Nodes might cease to function as the result of a catastrophic event, causing the entire network to operate erratically. In this situation, burdens previously carried by the now non-operational nodes must be allocated to other nodes within the network.

The network manager must have some comprehensive means of monitoring the operation of the network. This includes monitoring the performance of individual nodes, and assessing the effect individual nodes have on the entire network. With this information, network managers are better able to make necessary adjustments to ensure proper network operation.

Network information is often presented to the network manager via a computer display operating under the control of specially designed software. This software must contain a suite of sophisticated subroutines for data collection, synthesis, and analysis. The software must also present this data to the user in a manner that effectively conveys the sought-after information.

Today, graphical user interfaces (GUIs) commonly provide the interface between software and the user. GUIs differ from conventional methods in that, wherever possible, graphical images rather than tabular data are used to either present output to the user, or solicit input from the user. For example, a GUI might present to the network manager a graphical representation of the network, indicating pictorially how nodes are interconnected and the relative burdens each node carries, as opposed to a tabular listing of the nodes with the associated numerical data. The network manager might provide information to the software using a mouse point-and-click operation, rather than entering commands via the keyboard.

Those developing network management GUIs are commonly faced with the problem of representing complex networks in an effective manner. Displays of large networks must present to the network manager a tremendous amount of information. For example, a typical telecommunications network contains thousands of network nodes and hundreds of thousands of circuits which connect the nodes.

A network display might uniquely identify every node and every connection. While technically the most accurate, this approach tends to overwhelm the user with a cluttered display and obscure the underlying information intended to be communicated. Maps might be simplified by displaying only select nodes in the network. The display obviously becomes less cluttered as more nodes are eliminated. However, eliminating nodes in an arbitrary fashion could present a false and misleading picture to network managers.

Accordingly, a need exists for a system of generating network maps which present sufficient detail to network managers to enable them to make informed decisions, but which do not either overwhelm the user with detail or present a simple but misleading picture.

SUMMARY OF THE INVENTION

Briefly stated, the present invention is directed to a system and method for representing a network according to a hierarchy of views of varying detail.

The present invention models networks as a plurality of interconnected nodes. The display is simplified by combining network elements (i.e., nodes and connections) in two ways. Nearby nodes within a user-selectable proximity are displayed as a single "supernode." Similarly, connections between all the nodes represented by two supernodes are displayed as a single connection between the supernodes.

The present invention adjusts the relative size of each supernode in proportion to the number of nodes each supernode represents. Similarly, the thickness of each inter-supernode connection is adjusted in proportion to the number of inter-node connections it represents.

The present invention allows a user to conveniently "zoom-in" or "zoom-out," and to adjust the level of detail depicted in the display.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE FIGURES

The present invention will be described with reference to the accompanying drawings, wherein:

FIG. 3A is a table containing node data retrieved by the network map generator from the node database for creating a network map display;

FIG. 3B is a table containing the same node data as in FIG. 3A, with additional data indicating which grid square each node falls within;

FIG. 3C is a table containing supernode data;

FIG. 3D is a table containing connectivity data retrieved by the network map generator from the connectivity database for creating a network map display;

FIG. 6 is one part.

DETAILED DESCRIPTION OF THE PREFERRED EMBODIMENTS

Overview of the Invention

The present invention is directed to a system and method for representing a network according to a hierarchy of views of varying detail. The present invention provides a display which may alternately depict a network at a high level of abstraction (minimal detail), at a low level (maximum detail), and levels of abstraction in between selectable by the user.

Varying levels of abstraction convey varying types of information. A high level of abstraction provides a "big picture" view of the network useful for determining the interaction between different nodes and the effect one node has on the rest. A low level of abstraction provides the user with a more precise representation of a single node or group of nodes of interest to the user.

The present invention is described below in the context of a telecommunications network. Although the present invention is ideally suited for displaying telecommunications networks, it is described as such for illustrative purposes only and not by way of limitation. The concepts described apply equally well to the display of other networks, such as LANs, WANs, and neural networks, as would be clear to one skilled in the art.

A typical telecommunications network contains thousands of interconnected network nodes. A display which includes every node and connection would overwhelm the user and obscure the data presented. With respect to telecommunications networks, large concentrations of nodes or transmission paths in close geographical proximity are common and present problems when depicting the network graphically.

Figure 1:
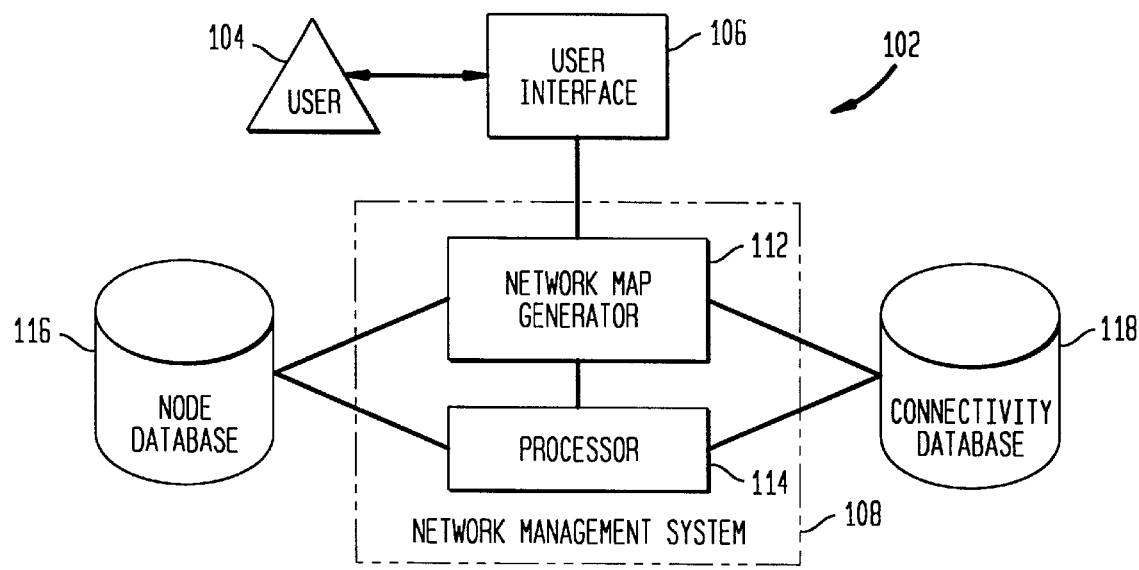
FIG. 1 is a block diagram of a network management environment in which the present invention is used.

FIG. 1 is a block diagram of a network management environment 102 in which the present invention is used. A user 104 interacts with a network management system 108 via a user interface 106. The user interface 106 serves as both an input device for the user 104 to provide data to the network management system 108, and as an output device to display data to the user 104. The user interface 106 preferably includes a display, a keyboard, and a mouse (none shown), all integrated into a GUI for data input and output.

The network management system 108 includes a processor 114 that performs network management functions with input from a network (not shown), as is well known in the art. The network management system 108 accesses a node database 116, which maintains data specifying the various nodes of the network and their location. The network management system 108 also accesses a connectivity database 118, which maintains data specifying the connectivity among the network nodes.

For example, in the telecommunications network environment, a network node may represent any one of many different types of equipment, such as a switching terminal, digital repeater site, or a DS-3 pass-through terminal. The connections between nodes may represent a DS-3 circuit, an OC-12 circuit, or any one of numerous other circuits.

The network management system 108 includes a network map generator 112 responsible for generating images of the network for graphical display to the user 104 via user interface 106. These images of the network displayed to the user 104 are hereinafter referred to as network map displays. The network map generator 112, and the maps it creates, embody the essence of the present invention.

Note that various embodiments of the network management environment 102 will be apparent to one skilled in the art. In one embodiment, the user interface 106 might represent a stand-alone workstation, such as a personal computer (PC), connected to a central network management system 108 charged with handling multiple user interface stations. Alternatively, user interface 106, network map generator 112, and processor 114 might all be contained within a single stand-alone workstation. The processor 114 and network map generator 112 might be implemented using a single computer processor. These, and other similar modifications, will be apparent to one skilled in the art.

The node database 116 and the connectivity database 118 may be implemented in any number of ways, as will also be apparent to one skilled in the art. They may actually be a single database, or multiple databases. They may be embodied within the network management system 108 or external to it. The network management system 108 may retrieve data from external databases and then build its own internal databases with the retrieved data. These differences are unimportant, so long as the data contained in the databases is available for input to the network management system 108.

In a preferred embodiment, the user 104 will interact with the network management system 108 via a GUI embodied in the user interface 106. The GUI will solicit input from the user 104, and present network map displays created by the network map generator 112 based on this input and data accessed from the node database 116 and connectivity database 118. The network map generator 112 will create new network map displays in response to new input provided by the user 104.

Generating Network Map Displays

Figure 2A:
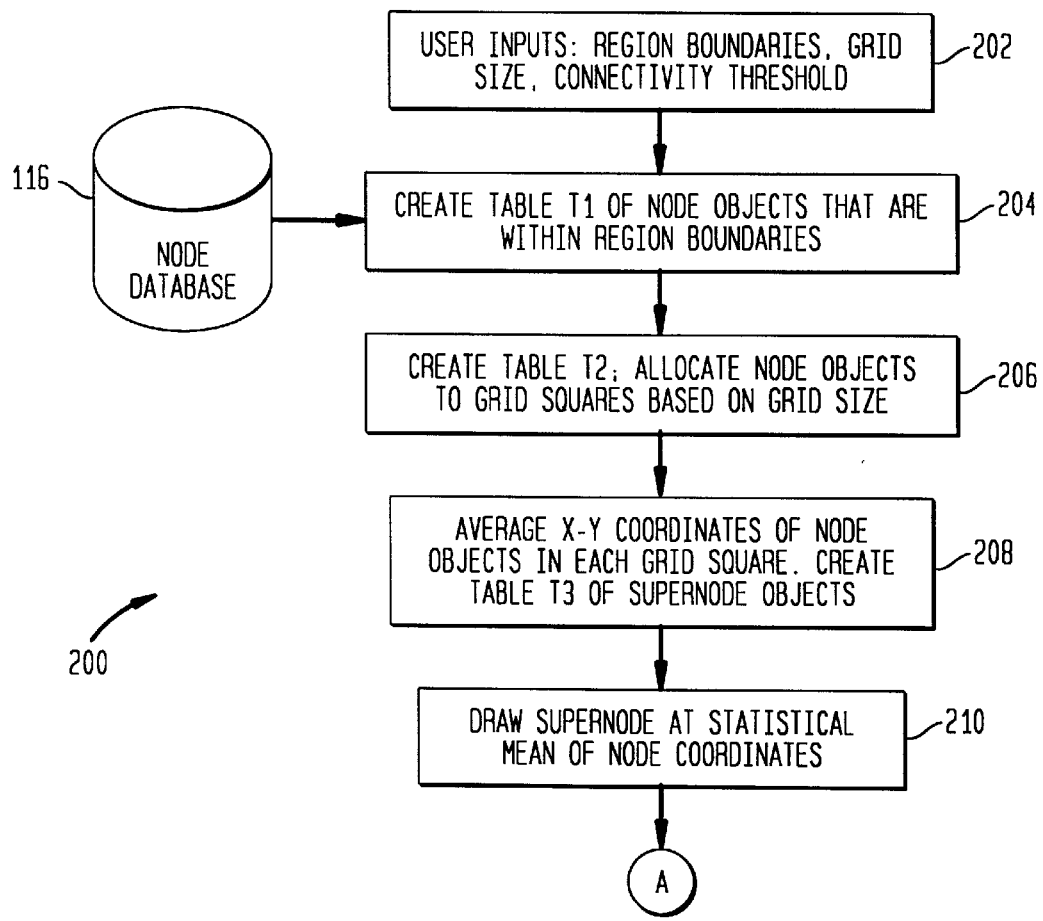
FIG. 2A is a flowchart illustrating the preferred operation of the present invention when placing supernodes within the network map display.
Figure 2B:
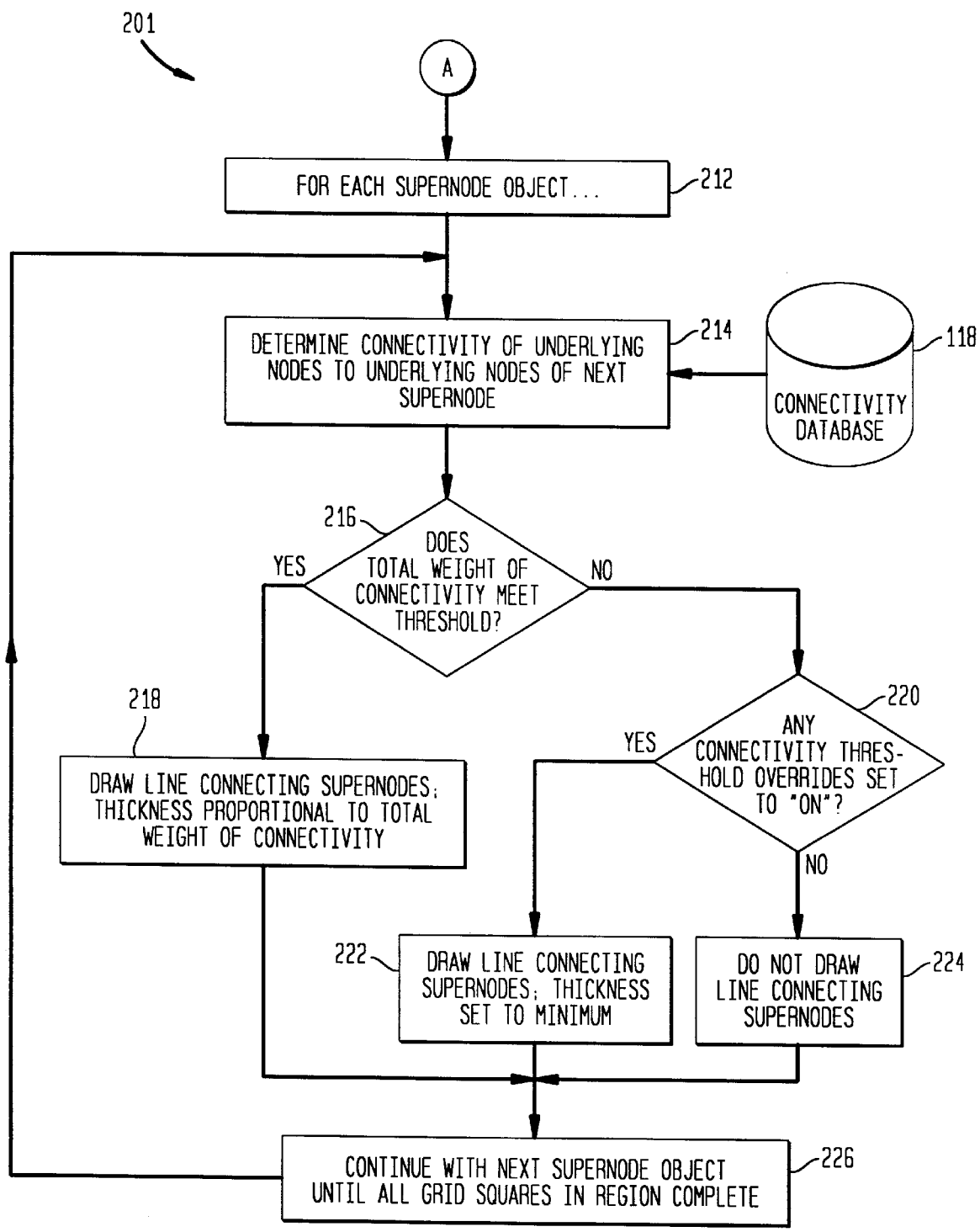
FIG. 2B is a flowchart illustrating the preferred operation of the present invention when representing connectivity within the network map display.

FIG. 2A and FIG. 2B are flowcharts representing the operation of the present invention in generating a network map display. FIG. 2A is a flowchart 200 representing the process of creating supernodes. FIG. 2B is a flowchart 201 representing the process of displaying supernode connectivity.

Displaying Supernodes

Referring to FIG. 2A, in step 202 the user 104 inputs three parameters used in creating a network map display: region boundaries, grid size, and the connectivity threshold. The region boundaries define geographically the portion of the overall network that will be displayed in the network map display. They are specified as two X-coordinates and two Y-coordinates, each coordinate being a boundary of the region that is to be displayed. The user 104 preferably selects this region by executing a point-and-click operation using a mouse. Alternatively, the user 104 may input these numbers manually using a conventional keyboard.

In step 204, the network map generator 112 retrieves pertinent data from the node database 116 and creates a table T1, as shown in FIG. 3A, that is a subset of the data found in node database 116. In a preferred embodiment, nodes are designated within the network management system 108 by a node identifier and X-Y coordinates of each node. For example, record 302 of table T1 contains the following data: node identifier "NE1," X coordinate "3," and Y coordinate "4." Node identifiers are arbitrary and assigned for convenience. The X-Y coordinates may be given in any units (e.g., degrees/minutes, miles). The only constraints are that all coordinates are given in the same units and share a common reference point.

Figure 4A:
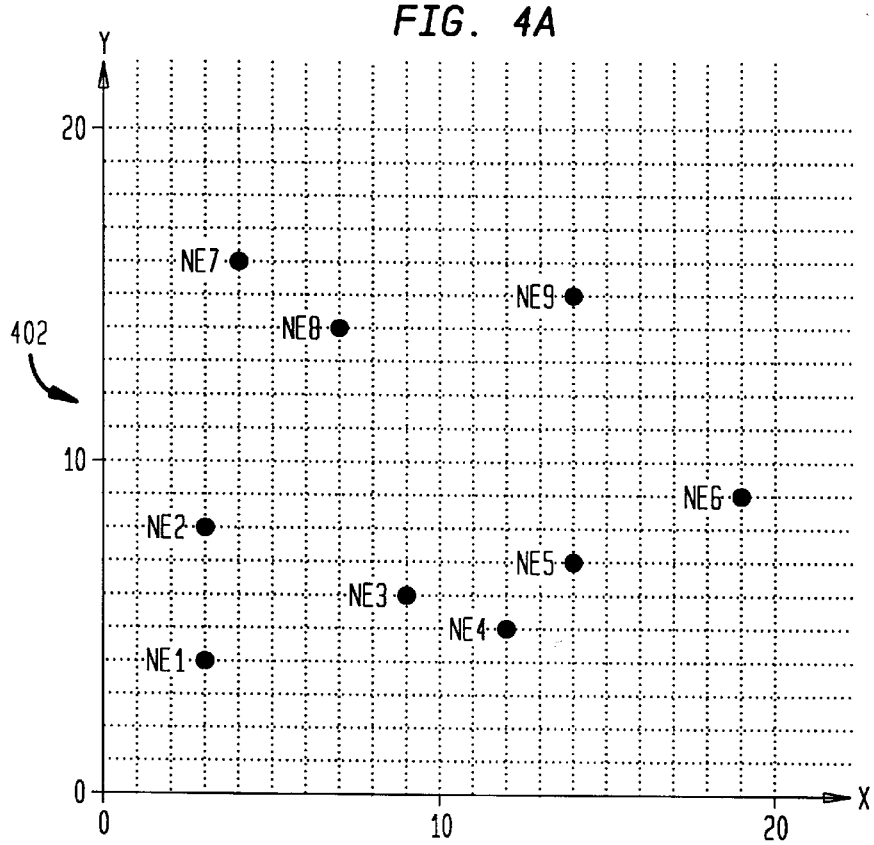
FIG. 4A illustrates an example layout of nine nodes that fall within the region boundaries specified by the user.

The network map generator 112 generates table T1 by sweeping through the node database 116 and extracting records for each node whose X and Y coordinates are within the region boundaries provided by the user 104 in step 202. Table T1 may be built as a table, an array, an object database, or any functionally equivalent software structure as will be apparent to one skilled in the art. FIG. 4A is a graph 402 representing the node data contained in table T1.

In step 206, the network map generator 112 groups nodes into "supernodes" according to their geographical proximity. A supernode is a single display object which represents a collection of nodes. In the preferred embodiment, the network map generator 112 performs this grouping by overlaying the area defined by the region boundaries with a grid of squares, the dimension of each square set to the grid size entered by the user 104 in step 202. All of the nodes falling within a single grid square are grouped into a single supernode.

The network map generator 112 creates table T2, shown in FIG. 3B, by sweeping through table T1 and assigning each node to a grid square by matching the coordinates of the node to those of a square. Table T2 therefore contains two additional columns of data corresponding to the grid square that each node falls within.

Figure 4B:
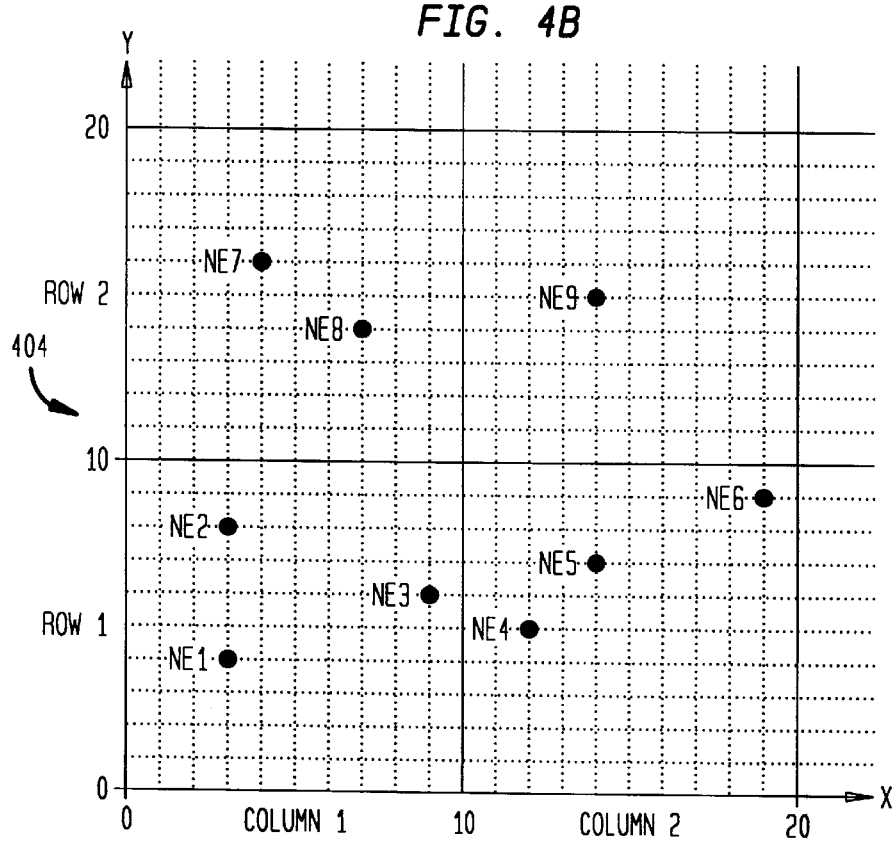
FIG. 4B illustrates a user-defined grid imposed on the example layout shown in FIG. 4A.

For example, FIG. 4B is a graph 404 representing the node data of table T1 with the grid square overlay, where the user input grid size is 10. The region is thus divided into grid squares that are 10 units in each dimension. The rows correspond with Y coordinates and the columns correspond with X coordinates. FIG. 4B shows the layout of these grid squares and which square each node falls within.

In step 208, the preferred embodiment of the network map generator 112 determines the location of each supernode by averaging the X and Y coordinates of all the nodes that fall within a grid square. These average X and Y coordinates will specify the location of the superrode that will replace the individual nodes. Supernodes are therefore placed at the statistical mean of the node coordinates represented by the supernode.

There will be one supernode for each grid square containing at least one node. The size of each supernode will be proportional to the number of nodes that it represents. The network map generator 112 creates table T3, as shown in FIG. 3C, to identify the supernodes, their coordinates, and their relative size.

Figure 4C:
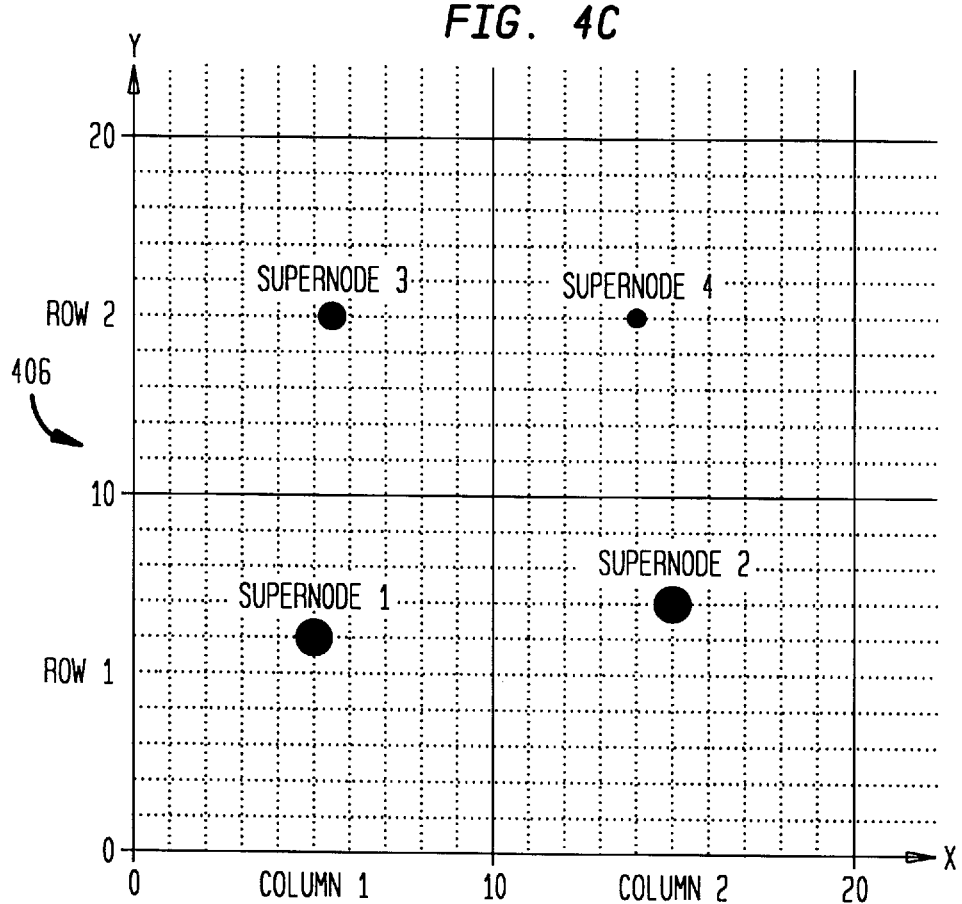
FIG. 4C illustrates the layout and relative size of the resulting supernodes corresponding to the nine nodes shown in FIG. 4A and FIG. 4B.

In step 210, the supernodes are displayed to the user 104 via user interface 106. FIG. 4C is a graph 406 showing the layout and relative size of the supernodes in the four grid squares from the above example.

There may be situations in which the coordinates at which a supernode is drawn falls within a body of water on the network map display. Such situations may occur in geographical areas in which densely populated land (where high concentrations of network nodes will be) is interspersed with water, such as in the Seattle/Puget Sound region or the New York/Long Island region. In a preferred embodiment, the network map generator 112 provides a supernode location override feature. The user 104 may select (e.g., by executing a point-and-click operation with a mouse) a land-based location at which to place the supernode. This selection generates X and Y coordinates. The coordinates of the supernode location selected by the user 104 override the coordinates of the supernode location calculated above.

Displaying Connectivity

Proceeding on to FIG. 2B, in step 212 the present invention successively performs a connectivity calculation for each supernode pair in the region defined by the user-input region boundaries. That is, the network map generator 112 determines the connectivity between each grid square and all the other grid squares. If sufficient connectivity is found, the supernodes associated with the two grid squares are connected by an inter-supernode connection. The following steps are performed for each possible combination of grid squares.

In step 214, the connections of each node in a first grid square to each node in a second grid square are summed. The network map generator 112 sweeps through the connectivity database 118 and accesses records for circuits that connect nodes in the first and second grid squares. Note that the term "circuit" refers to one possible embodiment of a network "connection," and is used by way of example and not limitation.

For example, referring to FIG. 4B, the network map generator 112 would first identify circuits in the connectivity database 118 that connected any of NE1, NE2, or NE3 to any of NE4, NE5, or NE6. Referring to FIG. 4C, these will contribute to the supernode 1 to supernode 2 connection. Circuits that connect NE1 to NE2, NE1 to NE3, or NE2 to NE3 would not be included.

Table T4, as shown in FIG. 3D, represents a preferred configuration of the connectivity database 118. Each circuit (i.e., connection) is identified by a circuit number as shown in the first column of table T4. Node1 and Node2 identify the two nodes that each circuit connects. In some cases, circuits will connect two nodes in the same grid square; as noted above, these circuits are not considered. The network map generator 112 only considers circuits connecting nodes in different grid squares when determining inter-supernode connectivity.

In step 216, the network map generator 112 determines whether the total "weight" of the connectivity between the first and second grid squares exceeds the connectivity threshold entered by the user 104 in step 202. In a preferred embodiment, each inter-node connection has a weight assigned to it, which may represent the number of circuits or some other value associated with that connection. This field is shown in table T4.

The connectivity threshold specifies the minimum "amount" of connectivity between supernodes, as measured by the total weight, required for an inter-supernode connection to be displayed to the user 104. The connectivity threshold and circuit weights must be given in the same units for proper comparison.

The connectivity threshold and weight measure may be defined as needed by the user in various embodiments of the present invention. These values may represent the number of DS-3 circuits between nodes, some arbitrary measure of the connection, some combination of the above (e.g., a weighted number of DS-3 circuits), or numerous other measures as would be clear to one skilled in the art. The only requirement is that these values be measured in the same units consistently throughout the connectivity database 118 and the GUI embodied in the user interface 106.

In step 218, if the total weight meets or exceeds the connectivity threshold, a line is drawn between the two supernodes associated with those grid squares. The thickness of the inter-supernode connection is proportional to the total weight.

If the total weight does not meet the connectivity threshold, then in step 220, the network map generator 112 determines whether any circuit has a connectivity threshold override (CTO) designation, as shown in table T4. The network map generator 112 sweeps through table T4 checking for an "on" indication in the CTO field. The CTO "on" designation overrides the threshold comparison of step 216, causing a line to be drawn between the two supernodes in step 222 regardless of the connectivity weight. The network map generator 112 draws these connections with minimal thickness, as the weight of the connection would not meet the connectivity threshold.

The CTO is useful for displaying circuits that are important, though comparatively low in weight (i.e., low number of circuits). For example, in table T4 the circuit connecting NE3 and NE4 contributes to the inter-supernode connection between supernodes 1 and 2 in FIG. 4C. This connection will be drawn even if the total weight of inter-node connections between these two grid squares does not meet the connectivity threshold set by the user. Conversely, a CTO "off" designation would require a connectivity weight equal to or greater than the connectivity threshold for an inter-supernode connection to be drawn.

In step 224, the network map generator 112 will not draw an intersupernode connection if the total connectivity weight falls below the connectivity threshold (step 216), and none of the circuits were designated as CTO "on."

In step 226, the network map generator 112 repeats the same process with the next pair of grid squares, until all connections between supernodes have been assessed.

Example Network Map Displays

Figure 5:
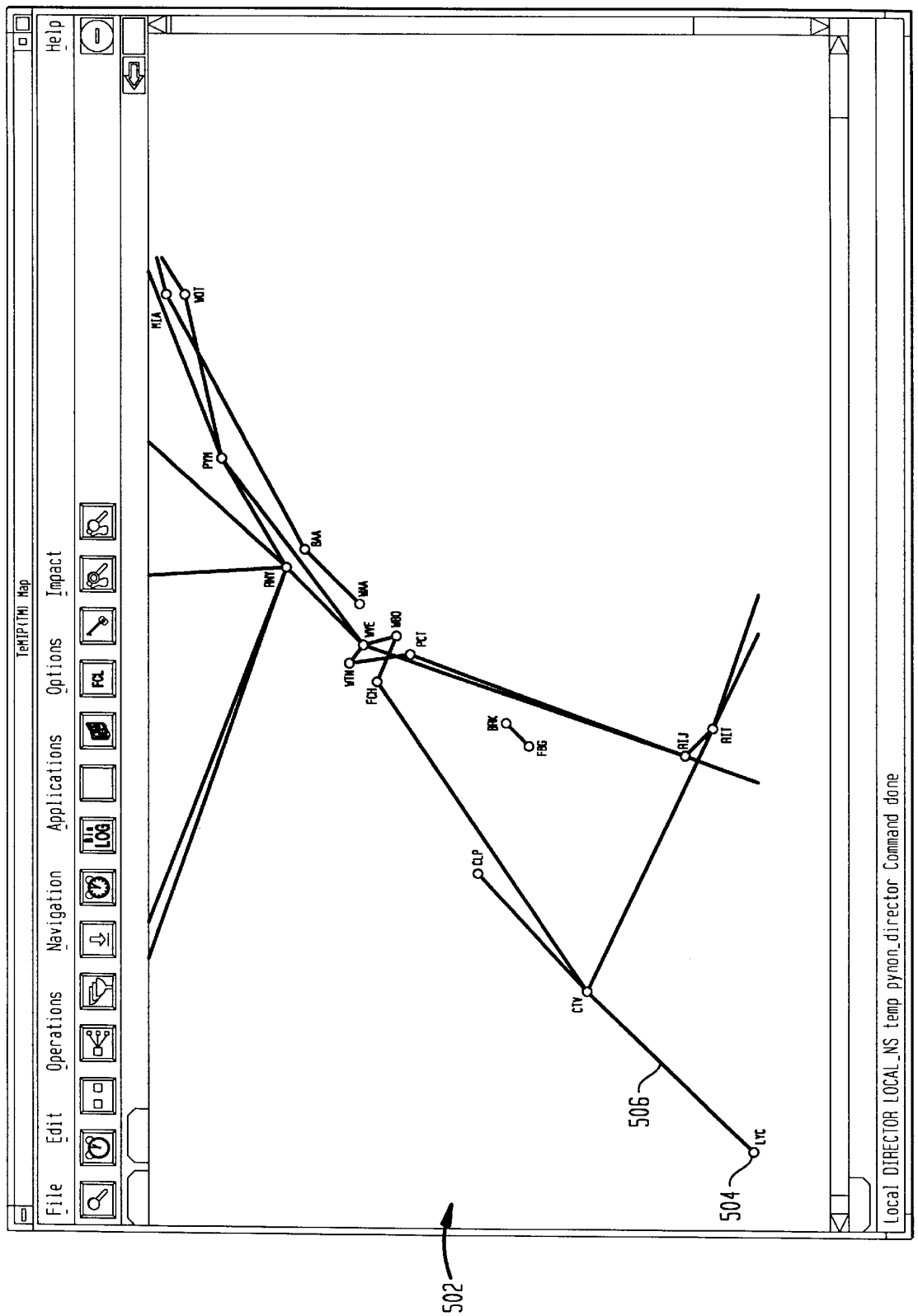
FIG. 5 is a network map display depicting a telecommunications network at the lowest level of abstraction.

FIG. 5 is an example network map display 502 depicting a telecommunications network at the lowest level of abstraction (i.e., the highest level of detail). At this level of abstraction, each circle 504 represents a single node, and each line 506 represents a connection between two nodes 504. Though this level of abstraction allows the user 104 to monitor each individual node 504, the map becomes very complex and difficult to read as the geographical boundaries are expanded and more nodes 504 are included in the display.

Figure 6:
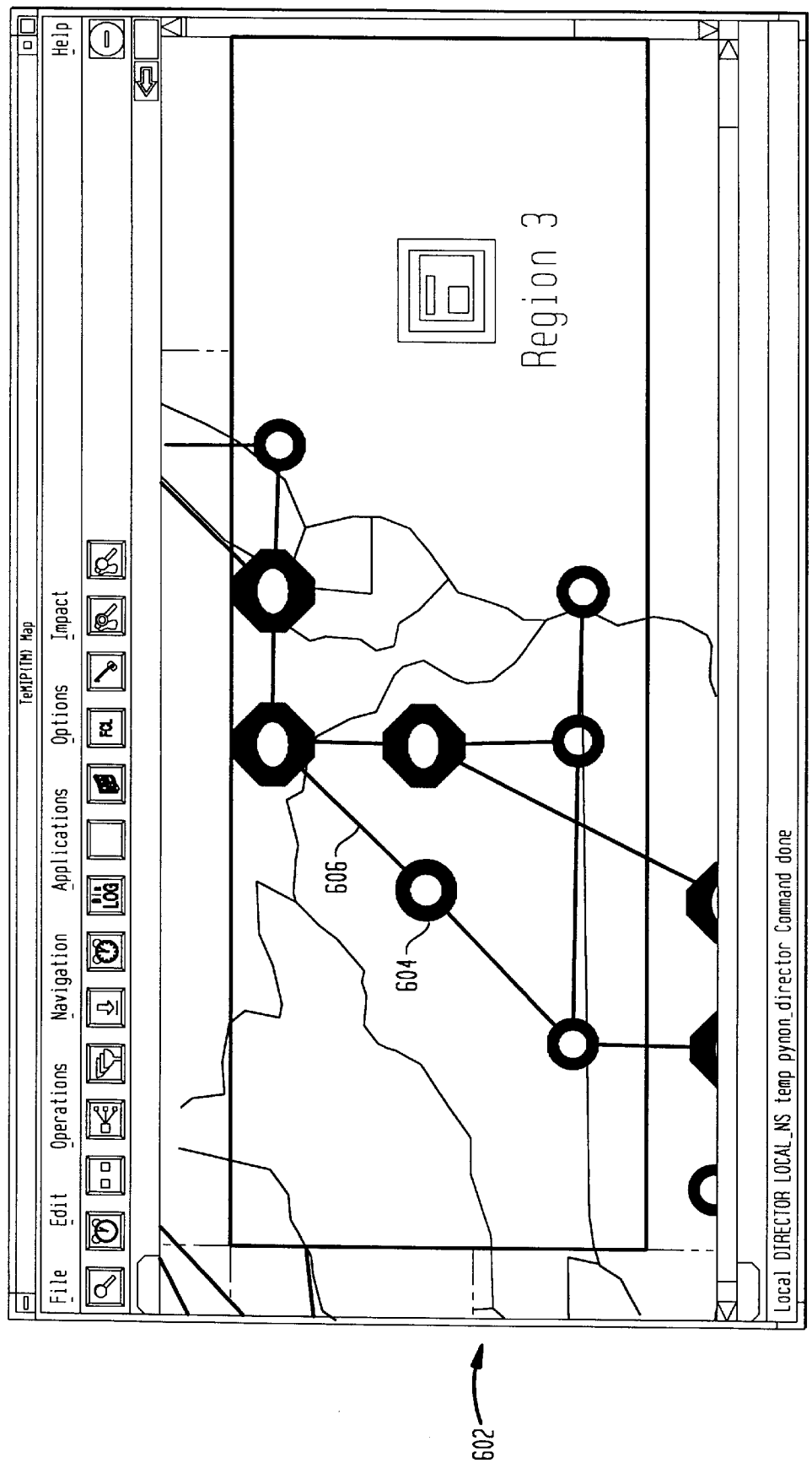
FIG. 6 is a network map display depicting the same telecommunications network as shown in FIG. 5, but at a higher level of abstraction.

FIG. 6 is another network map display 602 depicting the same telecommunications network as shown in FIG. 5, but at a higher level of abstraction. Here, nodes 504 are selectively grouped together according to their geographical proximity to form supernodes 604. This grouping is performed automatically by the network map generator 112, preferably according to the method described above. The user 104 determines the proximity at which nodes 504 will be grouped and the geographical boundaries of the display.

Again, the relative size of each supernode 604 is proportional to the number of nodes 504 that it represents. Similarly, the inter-supernode connections 606 are proportional in thickness to the number of inter-node connections 506 that exist between the nodes 504 represented by the two supernodes 604.

Figure 7:
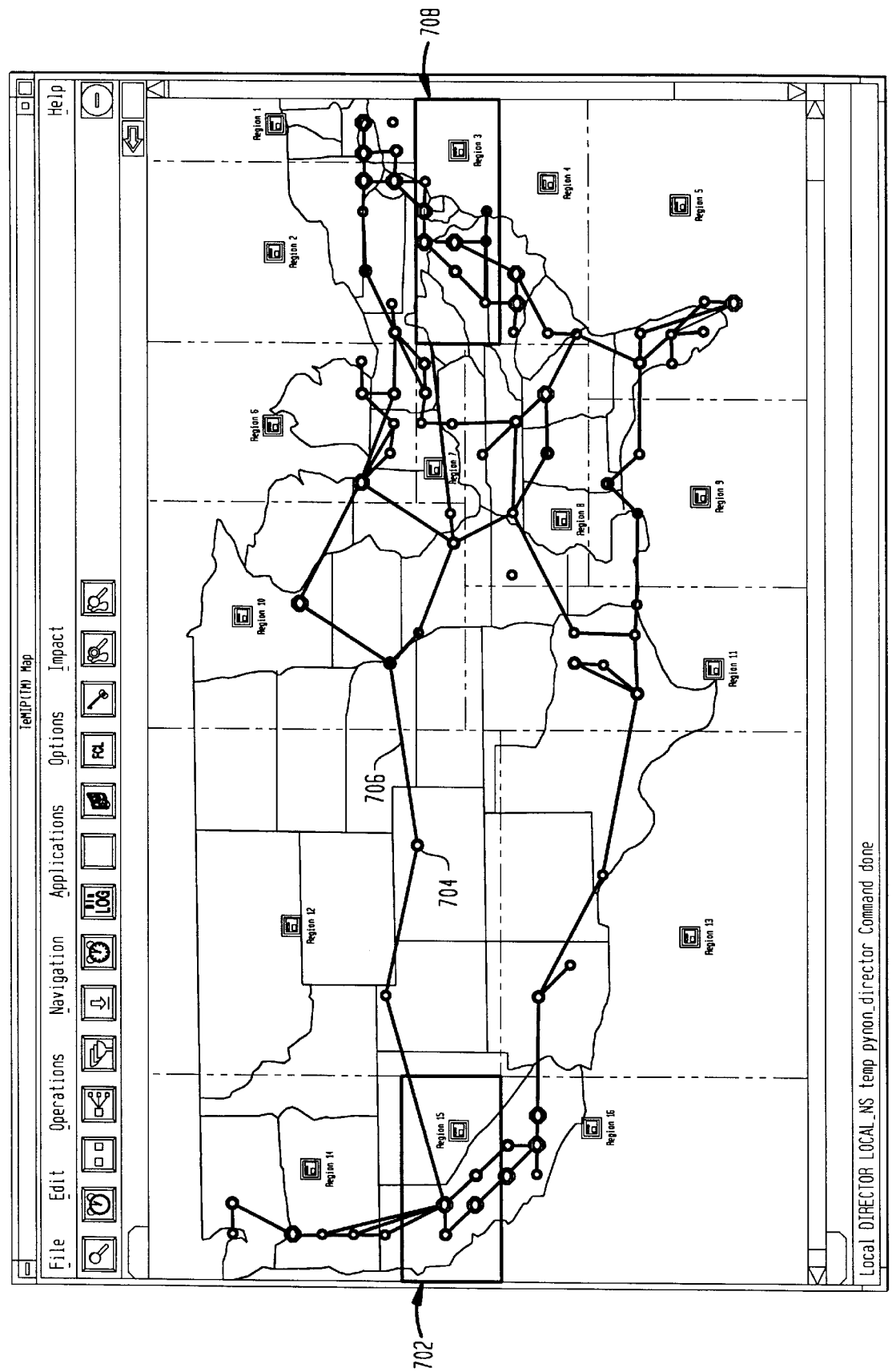
FIG. 7 is a network map display at an even higher level of abstraction depicting a nationwide telecommunications network, of which the telecommunications network depicted in FIG. 5

FIG. 7 is another network map display 702 at an even higher level of abstraction depicting a nationwide telecommunications network, of which the telecommunications network depicted in FIG. 5 and FIG. 6 is but a part. FIG. 5, FIG. 6, and FIG. 7 therefore represent a hierarchy of views of decreasing detail and increasing abstraction.

The present invention provides the user 104 with several methods of selecting an appropriate view with a desired level of detail. In order to select a new network map display, the user 104 must provide the network map generator 112 with region boundaries, a grid size, and a connectivity threshold. The region boundaries specify the geographic area covered by the display; the grid size and connectivity threshold define the level of detail. By adjusting the region boundaries, the user 104 may zoom-in or zoom-out. By adjusting the grid size and connectivity threshold the user 104 may select a level of abstraction.

The user interface 106 provides the user 104 with several convenient methods of selecting region boundaries. The overall network map display 702, as shown in FIG. 7, is grouped into pre-defined regions. For example, region 708 as indicated in FIG. 7 consists primarily of the states of Virginia, West Virginia, and Maryland. Note that network map display 602 corresponds to region 708 in FIG. 7.

The user 104 may select a particular region by entering the appropriate commands via the user interface 106. In a preferred embodiment, the user 104 will execute a point-and-click operation with a mouse to indicate which region is of interest. The network map generator 112 will then create a network map display with these pre-defined region boundaries. For example, a user 104 viewing network map 702 could enter region boundaries as required by step 202 by clicking on region 708, resulting in a display similar to network map display 602.

Alternatively, the user 104 might select region boundaries by selecting a particular supernode, preferably using a point-and-click operation with a mouse. The network map generator 112 then selects the appropriate region boundaries so that the network map display includes the individual nodes represented by that supernode. Similarly, when the user 104 selects an inter-supernode connection, the network map generator 112 displays all of the inter-node connections represented by the inter-supernode connection.

Alternatively, the user 104 might select arbitrary region boundaries by executing a point-and-drag operation using a mouse, thereby defining a rectangle indicative of the region of interest. These, and other alternatives will be apparent to one skilled in the art.

One skilled in the art will readily appreciate the utility of being able to dynamically zoom-in or zoom-out, adjusting the display presented at the user interface 106 as the need arises. For example, faced with an event affecting network operation, a network manager might zoom-in to the affected area to determine which specific nodes are involved, then zoom-out to assess what effect this event had on the operation of the overall network. This capability will assist the network manager in making the appropriate adjustments to the network.

While the present invention has been particularly shown and described with reference to several preferred embodiments thereof, it will be apparent to a person skilled in the relevant art that various changes in form and details may be made therein without departing from the spirit and scope of the invention as defined in the appended claims.

What is claimed is:

1. A network display system comprising:
   a node database;
   a connectivity database;
   a processor, coupled to said node database and to said connectivity database;
   a network map generator for generating a network map display, coupled to said processor, to said node database, and to said connectivity database, said network map generator including:
   means for representing a network as a plurality of nodes selectively interconnected by a plurality of inter-node connections,
   first means for selectively combining said plurality of nodes into a plurality of supernodes, and
   second means for selectively combining said plurality of inter-node connections into a plurality of inter-supernode connections; and
   a user interface, coupled to receive said network map display, for displaying said network map display to a user.

2. The system according to claim 1, wherein said network map generator receives a grid size, a set of region boundaries, and a connectivity threshold from said user via said user interface, and wherein said network map generator further comprises:
   means for creating a grid of squares overlaying the area defined by said set of region boundaries, wherein said squares have a dimension equal to said grid size.

3. The system according to claim 2, wherein said first means comprises:
   means for calculating the coordinates of said plurality of supernodes, wherein said coordinates for each supernode are equal to the statistical mean of the coordinates of said nodes located within each of said squares; and
   means for displaying said plurality of supernodes, one supernode for each of said squares containing at least one of said nodes, said supernode located at said coordinates within each of said squares.

4. The system according to claim 3, wherein said second means comprises:
   means for calculating the total weight of said plurality of inter-supernode connections, wherein said total weight for each inter-supernode connection is equal to the sum of the weights of said inter-node connections connecting said nodes represented by the particular supernodes connected by said inter-supernode connection; and
   means for displaying those of said plurality of inter-supernode connections whose total weight is greater than or equal to said connectivity threshold.

5. The system according to claim 2, wherein said user provides said set of region boundaries via said user interface by selecting a pre-defined region.

6. The system according to claim 2, wherein said user provides said set of region boundaries via said user interface by selecting one of said plurality of supernodes.

7. The system according to claim 2, wherein said user provides said set of region boundaries via said user interface by executing a point-and-drag operation using a mouse.

8. The system according to claim 1, wherein said plurality of supernodes are proportional in size to the number of said plurality of nodes that each of said supernodes represents.

9. The system according to claim 8, wherein said plurality of inter-supernode connections are proportional in thickness to the number of said inter-node connections that each of said inter-supernode connections represents.

10. The system according to claim 1, wherein said user interface comprises:
    a local processor, coupled to said network map generator;
    a display, coupled to said local processor, operating under the control of a graphical user interface (GUI);
    a mouse, coupled to said local processor; and
    a keyboard, coupled to said local processor.

11. The system according to claim 1, wherein said node database and said connectivity database are stored in common computer memory.

12. The system according to claim 1, wherein said network management system relates to a telecommunications network.

13. The system according to claim 12, wherein said plurality of nodes comprises either a switching terminal, digital repeater site, or a DS-3 pass-through terminal, and wherein said plurality of inter-node connections comprises either a DS-3 circuit or an OC-12 circuit.

14. The system according to claim 12, wherein said first means combines said plurality of nodes into a plurality of supernodes based on the geographical proximity of said plurality of nodes.

15. The system according to claim 1, wherein said network management system relates to a local area network (LAN).

16. The system according to claim 1, wherein said network management system relates to a wide area network (WAN).

17. The system according to claim 1, wherein said network management system relates to a neural network.

18. A computer program product for displaying a network map display on the user interface, the computer program product comprising:
    a computer usable medium having a computer readable program code means embodied in said medium for enabling the computer system to provide a network map display, said computer readable program code means comprising:
    computer readable first program code means for enabling the computer system to represent a network as a plurality of nodes selectively interconnected by a plurality of inter-node connections;
    computer readable second program code means for selectively combining said plurality of nodes into a plurality of supernodes; and
    computer readable third program code means for selectively combining said plurality of inter-node connections into a plurality of inter-supernode connections.

19. A method for displaying a network on a computer display comprising the steps of:
    (1) receiving input from a user;
    (2) creating a network map display based on said input, including the steps of:
        (a) representing a network as a plurality of nodes selectively interconnected by a plurality of inter-node connections,
        (b) selectively combining said plurality of nodes into a plurality of supernodes, and
        (c) selectively combining said plurality of inter-node connections into a plurality of inter-supernode connections; and
    (3) displaying said network map display.

20. The method according to claim 19, wherein said input comprises a grid size, a set of region boundaries, and a connectivity threshold, and wherein step (2) further comprises the step of:

creating a grid of squares overlaying the area defined by said set of region boundaries, wherein said squares have a dimension equal to said grid size.

21. The method according to claim 20, wherein step (2)(b) comprises the steps of:

calculating the coordinates of said plurality of supernodes, wherein said coordinates for each supernode are equal to the statistical mean of the coordinates of said nodes located within each of said squares; and displaying said plurality of supernodes, one supernode for each of said squares containing at least one of said nodes, said supernode located at said coordinates.

22. The method according to claim 21, wherein step (2)(c) comprises the steps of:

calculating the total weight of said plurality of inter-supernode connections, wherein said total weight for each inter-supernode connection is equal to the sum of the weights of said inter-node connections connecting said nodes represented by the particular supernodes connected by said inter-supernode connection; and displaying each of said plurality of inter-supernode connections whose total weight is greater than or equal to said connectivity threshold.

23. The method according to claim 19, wherein said plurality of supernodes are proportional in size to the number of said plurality of nodes that each of said supernodes represents.

24. The method according to claim 19, wherein said plurality of inter-supernode connections are proportional in thickness to the number of said inter-node connections that each of said inter-supernode connections represents.

25. The method according to claim 19, wherein said network comprises a telecommunications network.

26. The method according to claim 25, wherein said plurality of nodes comprises either a switching terminal, digital repeater site, or a DS-3 pass-through terminal, and wherein said plurality of inter-node connections comprises either a DS-3 circuit or an OC-12 circuit.

27. The method according to claim 25, wherein said step (2)(b) combines said plurality of nodes into a plurality of supernodes based on the geographical proximity of said plurality of nodes.

* * * * *